Dec. 12, 1944.        G. T. STAFFORD ET AL        2,365,117
PHYSICAL EXERCISING OR TRAINING APPARATUS
Filed Jan. 10, 1942        9 Sheets-Sheet 1

INVENTORS
GEORGE T. STAFFORD
FRANK ALBACH
BY
ATTORNEY

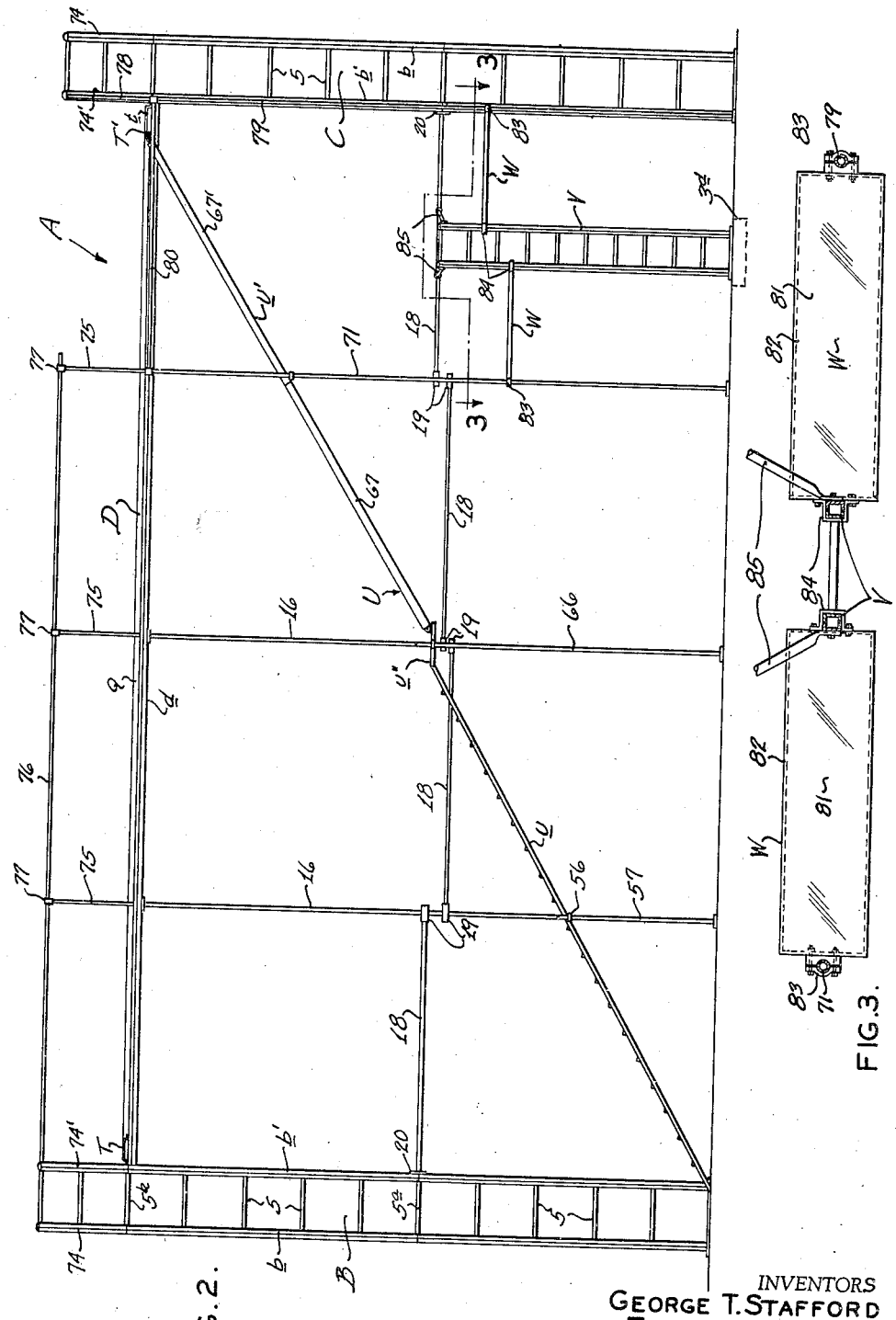

Dec. 12, 1944. G. T. STAFFORD ET AL 2,365,117
PHYSICAL EXERCISING OR TRAINING APPARATUS
Filed Jan. 10, 1942 9 Sheets-Sheet 5

INVENTORS
GEORGE T. STAFFORD
FRANK ALBACH
BY
ATTORNEY

Dec. 12, 1944. G. T. STAFFORD ET AL 2,365,117
PHYSICAL EXERCISING OR TRAINING APPARATUS
Filed Jan. 10, 1942 9 Sheets-Sheet 6
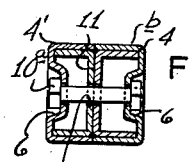
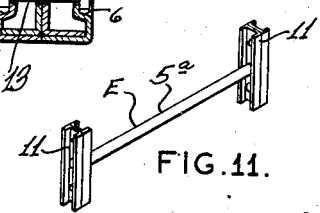
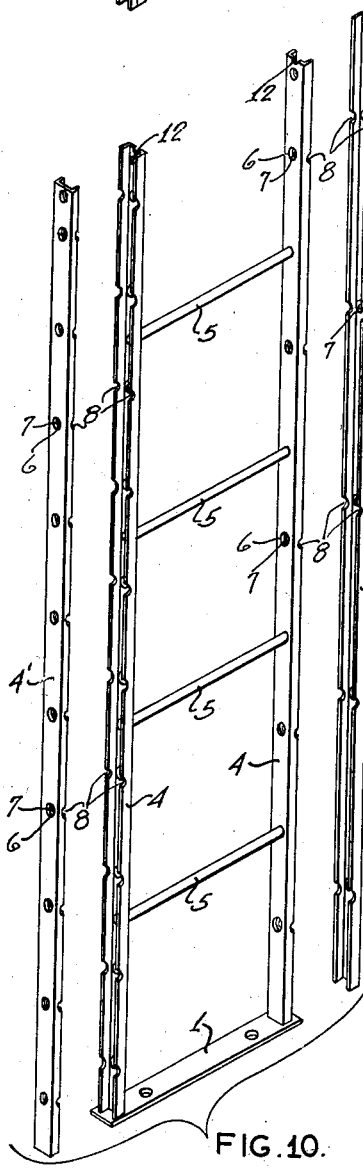
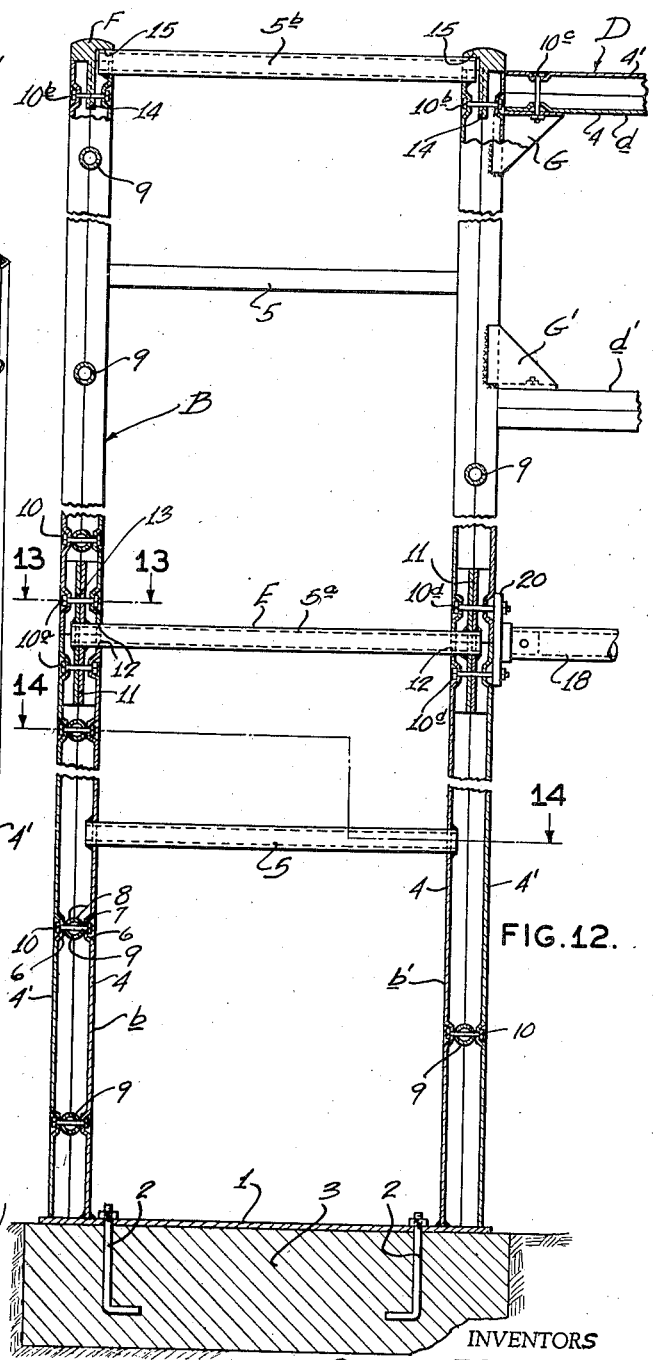
INVENTORS
GEORGE T. STAFFORD
FRANK ALBACH
BY
ATTORNEY

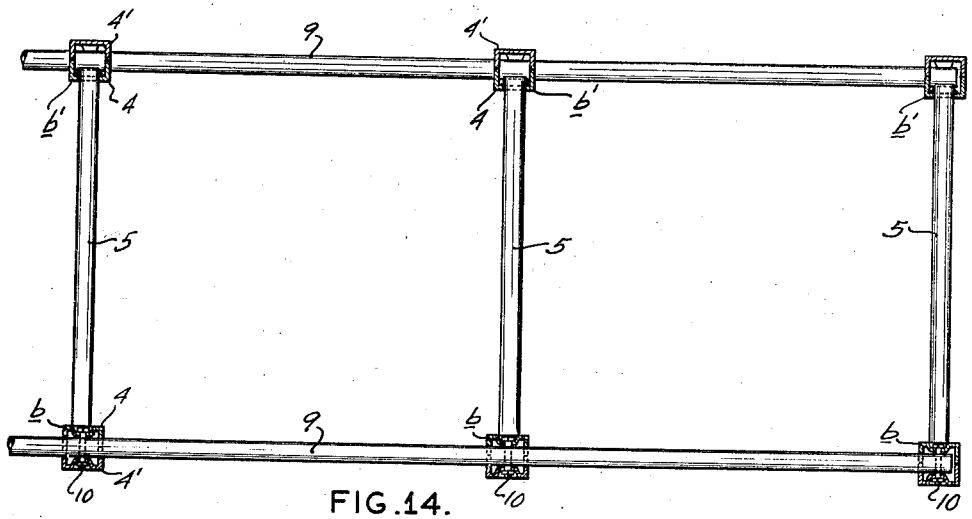
FIG.14.
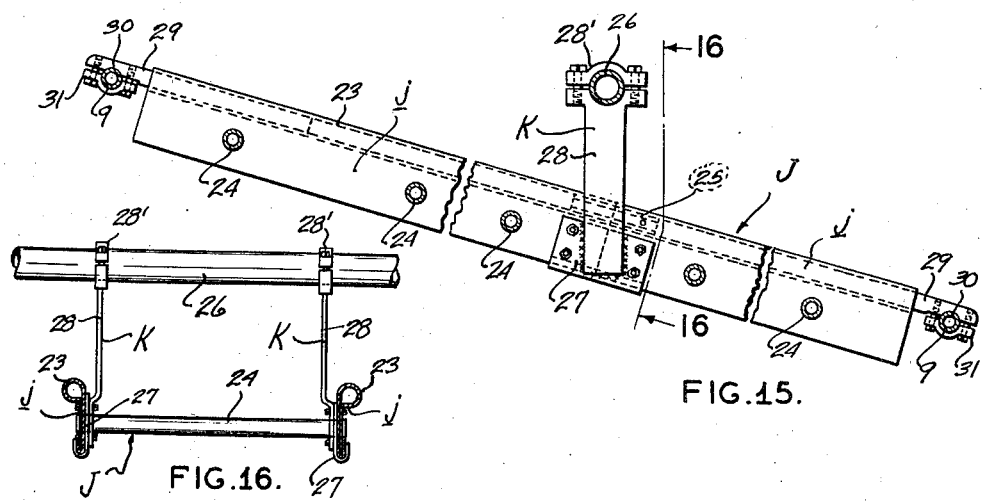
FIG.15.
FIG.16.
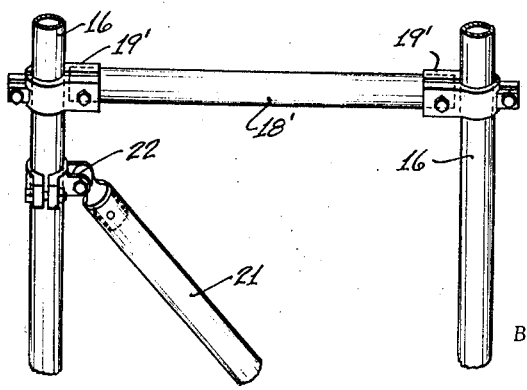
FIG.17.
INVENTORS
GEORGE T. STAFFORD
FRANK ALBACH
BY
ATTORNEY Dec. 12, 1944.   G. T. STAFFORD ET AL   2,365,117
PHYSICAL EXERCISING OR TRAINING APPARATUS
Filed Jan. 10, 1942   9 Sheets-Sheet 8
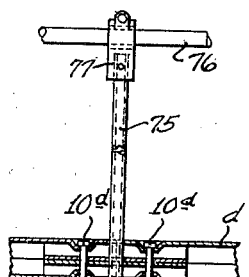
FIG.18.
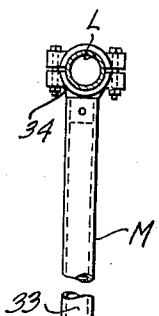
FIG.19.
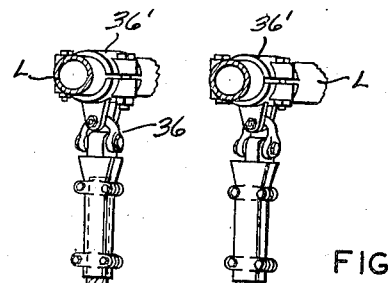
FIG.20.   FIG.21.
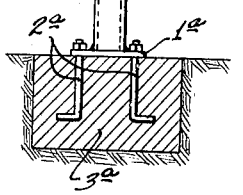
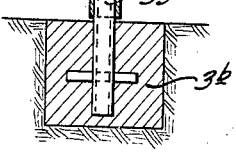
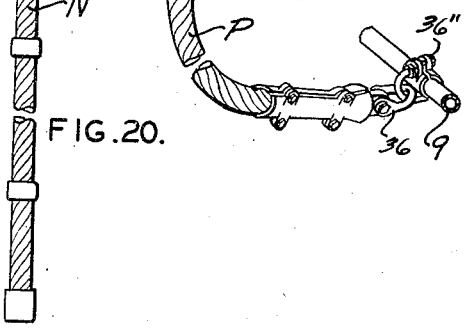
FIG.22.
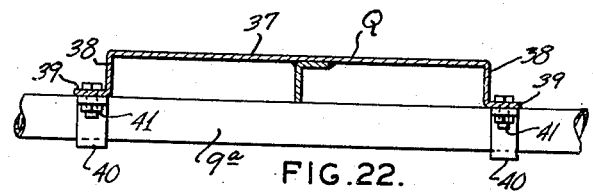
FIG.23.
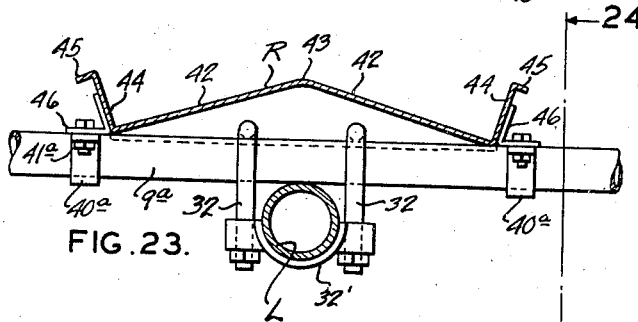
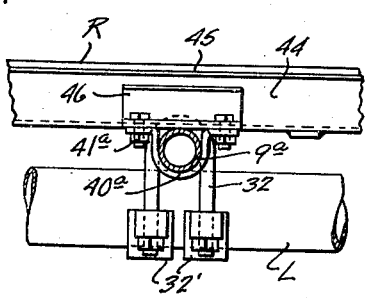
FIG.24.
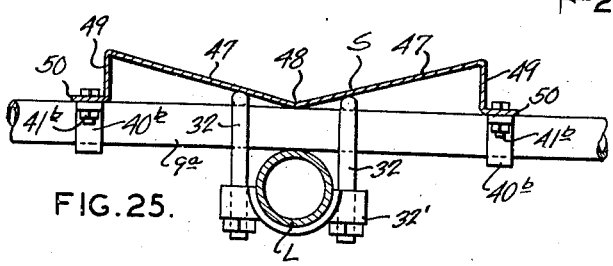
FIG.25.
INVENTORS
GEORGE T. STAFFORD
FRANK ALBACH
BY
ATTORNEY Dec. 12, 1944.  G. T. STAFFORD ET AL  2,365,117
PHYSICAL EXERCISING OR TRAINING APPARATUS
Filed Jan. 10, 1942   9 Sheets-Sheet 9

INVENTORS
GEORGE T. STAFFORD
FRANK ALBACH

ATTORNEY

Patented Dec. 12, 1944

2,365,117

UNITED STATES PATENT OFFICE 2,365,117

PHYSICAL EXERCISING OR TRAINING APPARATUS

George T. Stafford, Urbana, Ill., and Frank Albach, St. Louis, Mo., assignors, by mesne assignments, to Potomac Engineering Corporation, Chicago, Ill., a corporation of Delaware Application January 10, 1942, Serial No. 426,290

10 Claims. (Cl. 272—60)

This invention has to do with a certain new and useful physical exercising or training apparatus.

Our invention has for its chief object the provision of a structure compactly combining a plurality of different types of physical exercising equipment for the physical training and development simultaneously of a relatively large number of men.

Our invention has for a further object the provision of a structure of selected dimensions for the purposes stated which is especially, though not exclusively, adapted and designed for army camp installation.

Our invention has for a still further object the provision of a physical training structure of the kind and for the purposes stated which is built up of structural parts and members readily transported and co-operatively fabricated for convenient, rigid connection one with the other by a relatively small installation crew, the structure being strong, sturdy, durable, and rigidly braced to withstand the strains and stresses of use simultaneously by numerous individuals.

And with the above and other objects in view, our invention resides in the novel features of form, construction, arrangement, and combination of parts presently described and pointed out in the claims.

In the accompanying drawings (9 sheets)—

Figure 2 is an enlarged side elevational view of the structure, some of the exercising equipment embodied in the structure being omitted;

Figure 3 is an enlarged fragmental longitudinal sectional view of the structure taken approximately on the line 3—3, Figure 2;

Figure 5 is an enlarged longitudinal sectional view of the structure taken approximately on the line 5—5, Figure 1;

Figure 10 illustrates some of the end-members or frames of the structure in assembling relation;

Figure 11 is an enlarged isometric view of one of the connector-bars employed in joining some of the frame-members in end-to-end relation;

Figure 12 is an enlarged elevational view, partly broken away and in section, illustrating the frame and connector-members of Figures 10 and 11 in assembled joined relation;

Figure 13 is a detail sectional view taken approximately on the line 13—13, Figure 12;

Figure 14 is a detail sectional view taken approximately on the line 14—14, Figure 12;

Figure 15 is an enlarged detail view taken approximately on the line 15—15, Figure 6;

Figure 16 is a transverse sectional view taken approximately on the line 16—16, Figure 15;

Figure 17 is an enlarged fragmental view of the structure illustrating some of the cross-bracing thereof;

Figure 18 is an enlarged detail elevational view, partly broken away and in section, of one of the guard-rail supporting posts of the structure;

Figure 19 is an enlarged detail elevational view, partly broken away and in section, of one of the climbing-poles of the structure;

Figure 20 is an enlarged detail elevational view, partly broken away, of one of the hanging climbing-ropes of the structure;

Figure 21 is an enlarged detail elevational view, partly broken away, of one of the inclined climbing-ropes of the structure;

Figure 22 is an enlarged transverse sectional view of one of the cat-walks of the structure taken approximately on the line 22—22, Figure 1;

Figure 23 is an enlarged transverse sectional view of another cat-walk of the structure taken approximately on the line 23—23, Figure 1;

Figure 24 is a sectional view of the structure taken approximately on the line 24—24, Figure 23;

Figure 25 is an enlarged transverse sectional view of another cat-walk of the structure taken approximately on the line 25—25, Figure 1;

Figure 28:
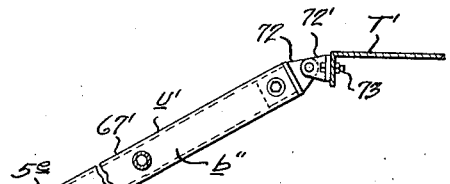
Figure 28 is a fragmental longitudinal sectional view of the upper ramp member of the structure taken approximately on the line 28—28, Figure 1.
Figure 29:
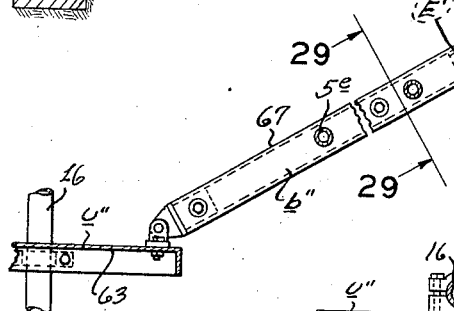

Figure 29 is a transverse sectional view taken approximately on the line 29—29, Figure 28; and The stall bar tower section B and the jungle tower section C of the structure A may be spaced at a selected or suitable distance, and joining such sections B and C in so spaced parallel relation, is an intermediate or top section D, which includes a series of longitudinally extending so-called beams or rails $d$ disposed in selected or suitable spaced relation transversely of the structure and each structurally like either post $b$ or $b'$, each rail or beam $d$ accordingly and similarly including co-operable or companion pairs of channel-sections 4, 4', extended and joined in end-to-end relation longitudinally of the structure by splice-members E, the channels 4, 4', of each rail or beam $d$ being united by bolts 10 and in like manner joined transversely of the structure by tubular bars 9a, and each rail or beam $d$ being supported at its opposite ends by, and secured to, the uprights $b'$ of sections B and C by means of bolts 10c projected through the respective channels 4, 4', of the particular rail $d$ and through the bight of U-shaped triangular supporting braces G welded or otherwise permanently fixed in proper location to and upon the channels 4' of the respective posts $b'$ of the sections B and C, as best seen in Figure 12. It will be understood that the spacing, longitudinally of the structure, of the transversely disposed rungs 9a may be varied to meet the requirements in any particular installation.

And also extending longitudinally of the structure and in parallel relation to, and spaced downwardly from, some of the longitudinally extending beams or rails $d$, are additional longitudinal rails $d'$ rigidly joined at their ends to the posts $b'$ of the end sections B and C by additional U-shaped supporting braces G' in a manner similar to the joint or connection between the rails $d$ and the posts $b'$, the one rail $d$ being joined to its registering rail $d'$ by means of short vertically disposed tubular sections 5c and two adjacent rails $d'$, being similarly joined by short horizontally disposed tubular bars 5d in a manner similar to the respective longitudinal connections or joints between the posts $b$ and $b'$ of the respective sections B and C.

Figure 1:
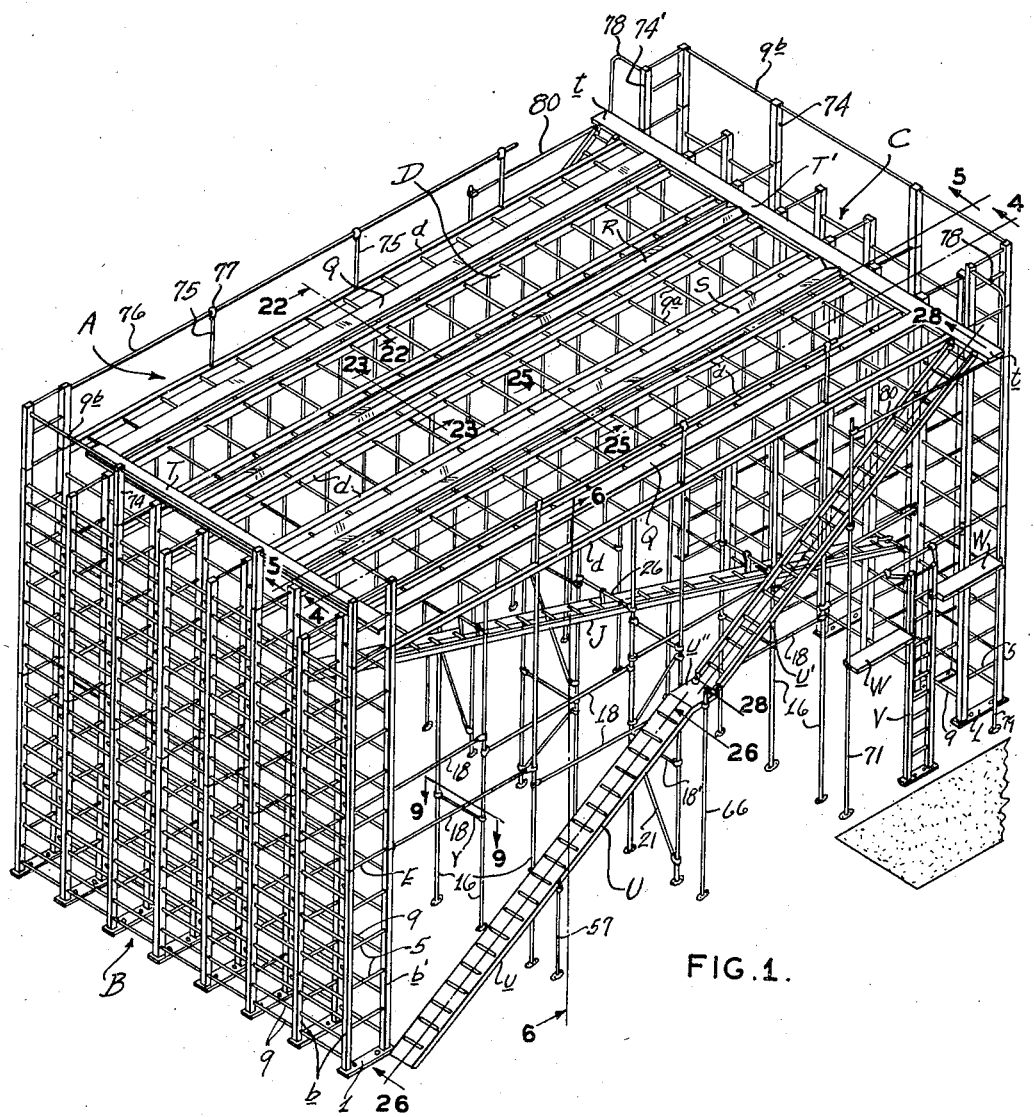
Figure 1 is an isometric view of a structure combining varied physical exercising or training equipment constructed in accordance with and embodying our invention.
Figure 4:
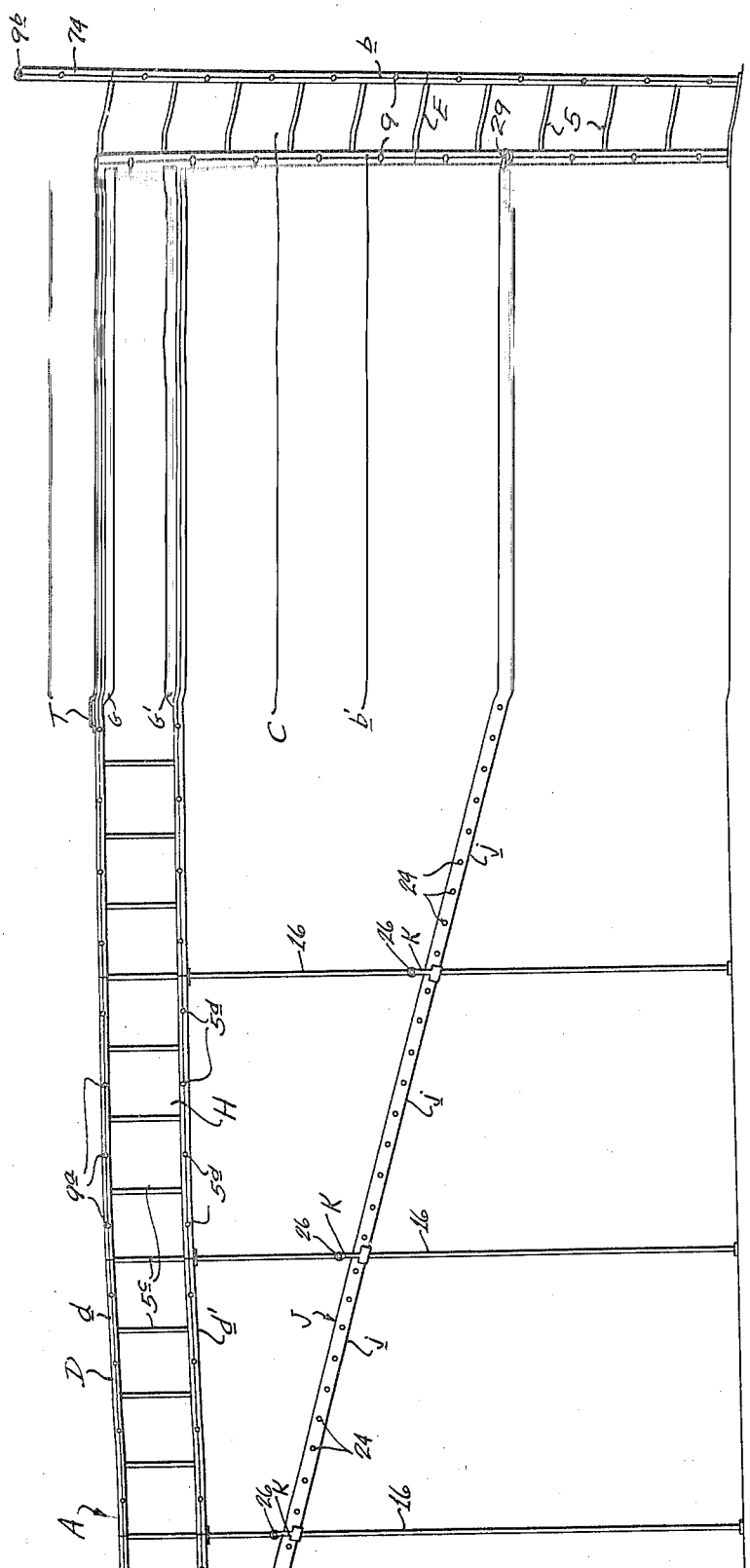
Figure 4 is an enlarged longitudinal sectional view of the structure taken approximately on the line 4—4, Figure 1.
Figures 6, 7, 8, 9:
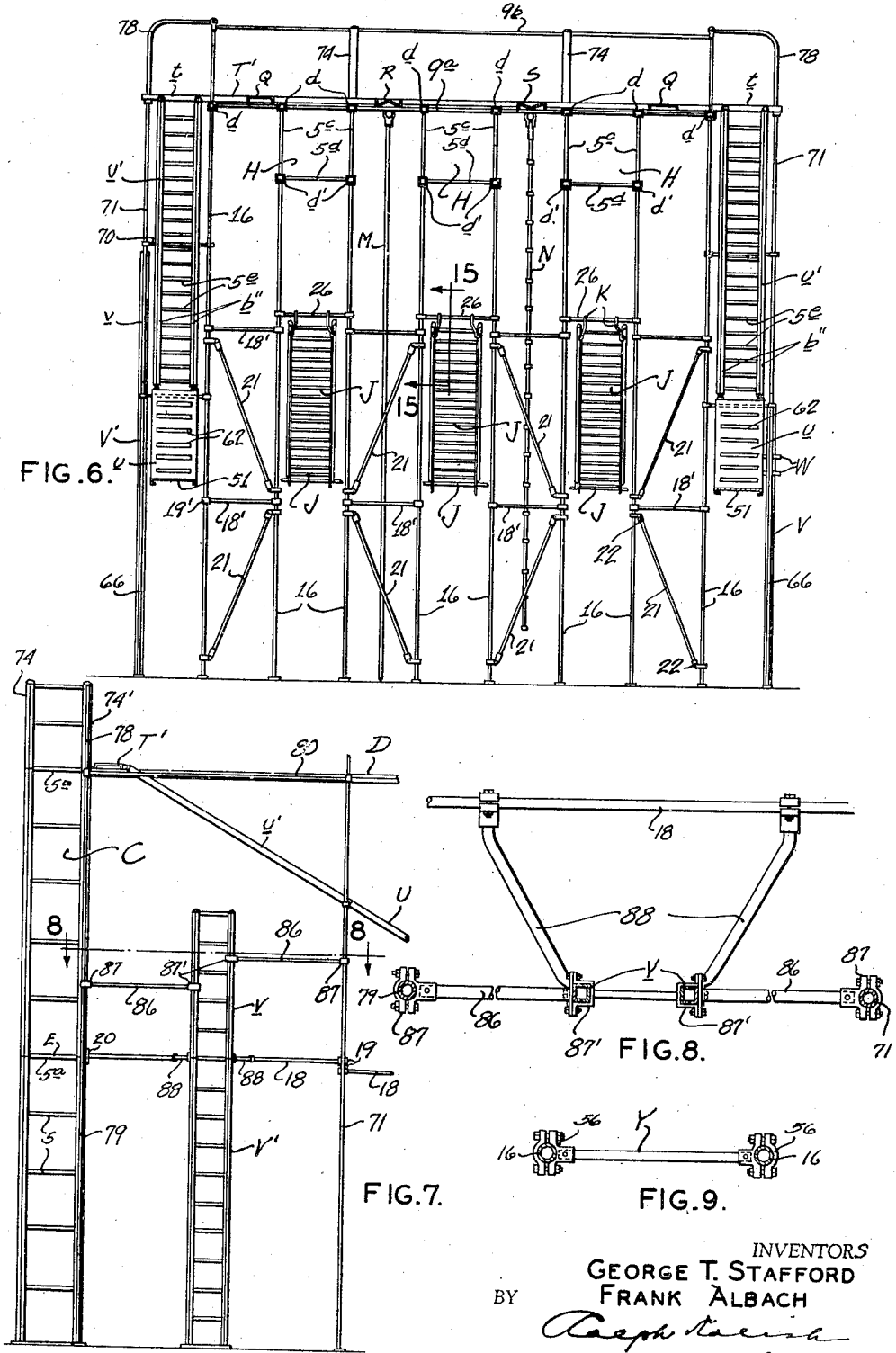
Figure 6 is an enlarged vertical sectional view of the structure taken approximately on the line 6—6, Figure 1.
Figure 7 is an enlarged fragmental side elevational view of the structure viewed from the side opposite to that illustrated in Figure 2, some of the exercising equipment embodied in the structure being likewise omitted.
Figure 8 is an enlarged sectional plan view taken approximately on the line 8—8, Figure 7.
Figure 9 is an enlarged sectional plan view taken approximately on the line 9—9, Figure 1.

Again, it will be understood that the spacing longitudinally of the structure between the several upright tubular bars 5c and the spacing laterally between the horizontally disposed bars 5d may be selectively varied to meet the requirements of the particular installation, and thus, as best seen in Figures 1, 4, and 6, the structure A uniquely combines a plurality of longitudinally extending, transversely spaced physical exercising equipment H of so-called crawl-tunnel type, the several rails or beams $d$ of the top section D and companion rails $d'$ of the tunnels H being braced and reinforced by vertically disposed preferably tubular posts or standards 16 correspondingly spaced transversely of the structure A and also spaced longitudinally of the structure A to coincide with the joints or connections between the longitudinally extending rails or beams $d, d'$. As best seen in Figure 18, each post or upright 16 at its lower end is welded or otherwise permanently fixed to and upon a plate 1a flatwise disposed, and by means of suitable bolts 2a anchored, to and upon an embedded or other suitable foundation 3a, and at its upper end has a fixed plate 17 apertured for connection with suitably extended or elongated channel-securing bolts 10d of the respective rails or beams $d, d'$.

As best seen in Figures 1, 2, 7, and 12, the two outer longitudinal rows or series of uprights or posts 16 are, in turn, braced and reinforced by longitudinally extending tubular pipe sections 18 horizontally disposed therebetween, the intermediate sections 18 being at their respective opposite ends by suitable clamps 19 preferably of split-collar type fixed to respective uprights 16, and the pipe or tubular sections 18 extending between the end-posts 16 and the end sections B and C being joined to such end-posts 16 by clamps 19 and joined to the end sections B, C, preferably by means of pipe-supporting plates 20, in turn, fixed to some of the uprights $b'$ by means of some of the channel-securing bolts 10d suitably elongated for the purpose (see Figure 12).

In addition, the several intermediate uprights or posts 16 are braced or reinforced by cross or transverse pipe sections 18', in turn, fixed at their respective ends to the several posts 16 by means of suitable clamps 19', as best seen in Figures 1, 6, and 17, and also by means of diagonally extending brace-members 21 connected at their respective ends to adjacent posts or uprights 16 by means of two-piece pivot clamps or the like 22 best seen in detail in Figure 17, the combined braces 18, 18', and 21 rigidly reinforcing the structure A against lateral and longitudinal strains resulting from the exercising upon the structure of numerous individuals at one and the same time.

Disposed longitudinally of the structure A intermediate some of the longitudinal rows of uprights or posts 16 and spaced beneath the respective tunnels H, is additional exercising equipment J of so-called inclined ladder type, best seen in Figures 4, 6, 15, and 16. As there shown, each ladder J includes side rails each made up of a plurality of preferably sheet metal sections $j$ each, in turn, comprising tubular hand-gripping portions 23. The rail-forming sections $j$ are welded or otherwise rigidly fixed to, and secured in spaced parallel relation by interposed transversely extending, tubular bars or rungs 24 and the sections $j$ of each rail are partially secured in end-to-end relation by splice-members 25 fixed in the tubular portion 23 of, and bridging the joints between, the respective sections $j$, as best seen in Figure 15. Preferably the ladder-sections $j$ are of such respective length that the joints therebetween are disposed approximately in registration with the supporting uprights 16, as best seen in Figure 4, and depending from tubular sections 26 disposed horizontally between, and fixed, in turn, to, adjacent uprights 16, are hangers K, each of which includes at its lower end a suitably inclined or beveled plate 27, which is welded or otherwise fixed, in turn, flatwise to, and spans the joint between, two adjacent units $j$, all as best seen in Figure 15. The hangers K thus not only function in suspending the respective ladders J upon the structure A, but in also reinforcing the connection between the several sections $j$ of each ladder side-rail, each hanger K including a plate-supporting strap 28 and a clamp assembly 28', best seen in Figure 15, by which the hanger K is fixed dependingly to a tubular section 26.

The end-units or sections $j$ of rack ladder J are suitably provided with fixed longitudinally projecting tubular members 29 each arcuately notched, as at 30, for engaging and partially embracing a selected ladder rung 9 of the respective end sections or towers B and C and to which rungs 9 the respective ladder J is firmly secured at its ends as by suitable clamps 31, best seen in Figure 15, the length and inclination of the respective ladders J being selectively varied to meet the requirements of any particular installation, as indicated in Figure 4.

Supported from the top-section transverse members 9ª by means of U-shaped pairs of hanger-bars 32 and disposed in longitudinal series intermediate the tunnels H, are registering saddles 32', upon which rest, and to which are suitably fixed, suitable longitudinally extending tubular or pipe members L, as best seen in Figures 5, 6, 23, and 24, supported by and depending from which is additional exercising equipment of the type commonly known as climbing poles M, depending or swinging climbing ropes N, and inclined climbing ropes P, of each of which there may be any selected number respectively disposed in a spaced series longitudinally of the structure A.

In turn, each climbing pole M, as best seen in Figure 19, is constructed of a suitable elongated tubular section 33 secured at its upper end to a pipe L as by means of a clamping assembly 34 and at its lower end rigidly anchored by means of a pipe section 35 to a suitable foundation 3ᵇ.

Each swinging rope N, as best seen in Figure 20, comprises a suitably elongated section of proper rope preferably provided longitudinally with a series of suitably spaced knots, projections, or the like for climbing assistance and at its upper end with a clevis or the like 36 suitably loosely attached, as by means of a clamping-assembly 36', to a respective support L.

Each inclined climbing rope P, as best seen in Figure 21, similarly comprises a suitably elongated section of proper rope attached at its upper end by means of a similar clamp-assembly 36' to one of the supporting members L and attached at its opposite or lower end, as by means of a clevis 36 and co-operable clamp-assembly 36'', to a selected transverse pipe section or rung 9 of either end section B or C, as indicated in Figure 5.

Disposed longitudinally upon the top section D of the structure A, is additional exercising equipment of the type commonly known as cat-walks, here designated Q, R, and S. Of such longitudinal cat-walks, there are, in the present instance, four in number, two of which, namely, the cat-walks Q, are disposed adjacent the opposite side margins of the structure and each of which is of regular channel shape in cross-section, as best seen in Figure 22, each cat-walk Q including a flat-top wall 37 having depending side walls 38, 38, flanged outwardly at their respective free margins, as at 39, and at such flanges fixed, as by means of U-shaped straps or the like 40 and bolts 41, to the respective transverse frame-members 9ª.

The remaining cat-walks of the present structure, namely, the cat-walks R and S, are, respectively, of pyramid and gutter type, the cat-walk R being located as best seen in Figure 6 and including a main wall comprising obliquely disposed members 42 converging centrally in a peak 43 and at their respective opposite outer margins being provided right-angularly with upwardly projecting side walls 44 preferably flanged outwardly at their respective upper free margins, as at 45, the cat-walk R being welded or otherwise fixed at its side walls 44 to suitable angle brackets 46, in turn, secured to the respective rungs or cross-members 9ª of top section D by means of suitable straps 40ª and bolts 41ª, all as best seen in Figure 23.

The cat-walk S is located also as best seen in Figure 6 and includes a main wall comprising obliquely disposed members 47 sloping downwardly and meeting centrally in a channel 48 and at their respective opposite outer margins having depending side walls 49 flanged outwardly, in turn, at their respective lower margins, as at 50, and at said flanges rigidly secured to the respectve rungs or cross-members 9ª of the top section D by additional U-shaped straps 40ᵇ and bolts 41ᵇ, all as best seen in Figure 25.

As best seen in Figures 1, 2, and 4, the walks Q, R, and S are spaced at their ends somewhat from the end towers B and C, and disposed on the structure A intermediate the respective end towers B and C and the respective walks Q, R, and S, are transversely disposed cat-walks T, T', preferably similar in form, contour, and shape to the cat-walks Q and rigidly suitably fixed to and upon the members of the top section D.

As best seen in Figure 1, the one cat-walk T' projects outwardly at its opposite ends, as at t, t, beyond the side margins of the top section D for connection with, and for partially supporting at their respective upper end, side ramps U, U, each of which includes a lower flat-top portion u, an upper ladder-portion u', and an intermediate platform u''.

Figure 27:
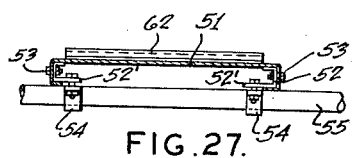
Figure 27 is a transverse sectional view of the structure taken approximately on the line 27—27, Figure 26.
Figure 26:
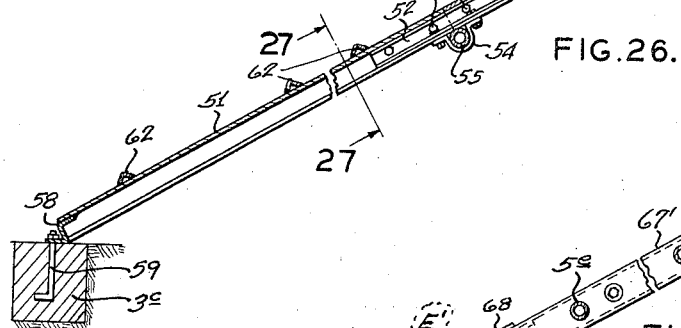
Figure 26 is a fragmental longitudinal sectional view of the lower ramp member of the structure taken approximately on the line 26—26, Figure 1.

In turn, the lower flat-top ramp-portion u, as best seen in Figures 26 and 27, includes channel-shaped sections 51 rigidly joined in end-to-end registration by means of channel irons 52 and bolts 53, the channel members 52 having opposed inwardly presented extensions 52' fixed, as by means of suitable U-shaped clamps 54, to and upon a transversely disposed tubular member 55, in turn, fixed, as by means of suitable clamps, such, for instance, as clamps 56, to one of the uprights or posts 16 and a registering upright 57, as best seen in Figure 1.

Welded or otherwise permanently fixed to the lower ramp-section 51, is a Z-shaped bar 58, in turn, bolted or otherwise secured, as at 59, to a suitable base, embedded foundation, or the like 3ᶜ; and welded or otherwise fixed to the upper end of the upper unit or channel 51, is an angle bar 60 rigidly bolted or otherwise fixed, as at 61, to the intermediate ramp-platform u'', as best seen in Figure 26.

Welded or otherwise fixed to and upon the upper face of the lower ladder section u, is a longitudinal series of suitably spaced tread-forming angle-members 62 for eliminating slipping of a trainee, as a person using the structure may be well designated.

Figure 30:
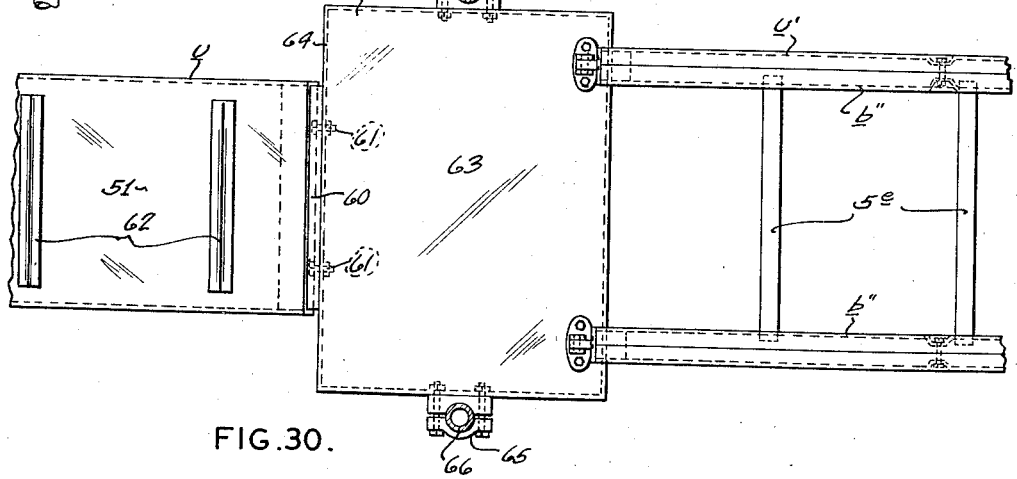

The intermediate ramp-platform u'' comprises a flat-top wall 63 marginally reinforced by depending flanges 64 and rigidly, as by means of suitable clamp assemblies 65, best seen in Figure 30, fixed horizontally of the structure A upon the adjacent upright or post 16 and a suitably spaced registering upright 66, as best seen in Figure 1.

The upper ramp portion u' comprises so-called ladder-sections 67, 67', each, in turn, including side rails b'' similar structurally to the posts b or b' of the end sections B and C and in like manner joined by cross-rungs 5ᵉ and the channel members of which are in like manner bolted together. The ladder-sections 67, 67', are in like manner rigidly secured together in end-to-end relation by means of splice-members E', all as best seen in Figure 28, and are also secured at the joint therebetween, as by means of Z-bars 68 and clamps 69, to a supporting cross-member 70, in turn, fixed, as by means of clamps similar to clamps 56, to and upon an adjacent upright 16 and a registering upright 71, all as best seen in Figures 1, 28, and 29.

At the upper end of its ladder-section 67', the ladder-portion u' of the ramp U is equipped with a suitable casting 72, in turn, preferably pivotally connected to a companion casting 72' bolted or otherwise fixed, as at 73, to the respective projecting end portion t of the cat-walk T', as best seen in Figures 1 and 28.

At the opposite ends of the structure A, the posts or uprights b are equipped with vertically disposed extensions 74, which, in turn, support, in elevated relation to the top section D, end guard rails 9$^b$.

As best seen in Figure 1, the posts b' of the end sections B, C, are also provided with upwardly presented extensions 74', which, in association with intermediate uprights or relatively short posts 75, support, also in spaced elevated relation to the top section D, guard-rails 76. Each of the uprights 75 is joined to a post 16 and the intermediate rail d as best seen in Figure 18, and is provided at its upper end with a clamp 77 for engaging a rail 76, which rails extend from the end section B longitudinally of the structure to adjacent the opposite end structure C, a space or passageway for a trainee being provided between the top section D and the side ramps U, U, as best seen in Figure 1.

Additional laterally disposed guard-rails 78 for the cat-walk extensions t, t, are supported as by means of some of the upright extensions 74' and suitably elongated additional uprights 79, as best seen in Figure 1, the uprights or posts 79 being suitably, while not here specifically shown, fixed at their lower end to and upon a foundation or base in a manner similar to the mounting of the several respective posts 16. And suitably clamped at an end to the respective uprights 79 and at their opposite end to the uprights 71, are longitudinally extending members 80 providing guard rails for the upper ramp sections u', as best seen in Figure 1.

Preferably disposed and anchored on a lateral side of the structure A intermediate the uprights 71 and 79, is a ladder unit V structurally similar to a pair of the posts b, b', and their uniting or joining rungs 5 of the end section or tower B. The ladder V is rigidly fixed at its lower end to a properly located foundation 3$^d$ and near its upper end supports so-called jumping platforms W, as best seen in Figures 1 and 2.

Each jumping platform W, in turn, is constructed of a suitable flat sheet metal section 81 marginally reinforced by downturned flanges 82, to the end flanges of which are suitably fixed pipe clamp assemblies 83 rigidly engaging posts or uprights 71 and 79, and to the inner end flanges of which are suitably attached and secured U-clamps 84 rigidly engaging the side rails of the ladder unit V. Fixed at an end to the upper end of the ladder unit V and at their upper end to one of the longitudinally extending brace-members 18 for laterally reinforcing the ladder V, are diagonally or angularly extending brace-members 85.

Similarly anchored on the opposite side of the structure A and disposed preferably midway between, and in registration with, uprights 71 and 79, is an additional ladder unit V' having joined thereto a ladder extension v in a manner similar to the connection between the several extensions of the posts b, b', of the end towers B and C, for supporting adjacent its upper end a pair of horizontal bars 86, each secured at its outer end by suitable pipe clamp assemblies 87 to the pipe posts 71 and 79 and at its inner end by pipe clamp assemblies 87' to the respective side rails of the ladder extension v, angularly disposed ladder reinforcing or brace-members 88 being fixed at their inner end to the ladder units V' and v and at their opposite end to adjacent longitudinal bars 18.

Additional horizontal turning bars Y are mounted upon the structure A at a suitable distance from the ground level and at selected locations, each such member Y including a suitable bar fixed, as by means of clamps 56, to and between adjacent uprights 16 for enabling additional turning exercises.

The structure answers and from installation and use has been found to most efficiently in every respect fulfill all the objects stated, and it is to be understood that changes and modifications in the form, construction, arrangement, and combination of the several parts of the apparatus may be made and substituted for those herein shown and described without departing from the nature and principle of our invention.

Having thus described our invention, what we claim and desire to secure by Letters Patent is:

1. In physical training apparatus, a structural member comprising a pair of sections each made up of companion channels, means for securing the channels of each section together with their flanges in edgewise abutting relation, some of said channels having notches in the end margins of their respective webs, and a splice-member comprising a bar embraced by the end notches of said channels and end members of I-section disposed within and fixed to the channels of said sections for securing the sections together in end-to-end relation.

2. In physical training apparatus, a pair of structural members each comprising a pair of sections, each section being made up of companion channels, means for securing the channels of each section together with their flanges in edgewise abutting relation, some of said channels having notches in the end margins of their respective webs, and a splice-member for securing the sections of the structural members together in end-to-end relation and said members in spaced parallel relation, said splice-member including a bar embraced adjacent its opposite ends by the end notches of contiguous channels and end members of I-section disposed within, and fixed to, the channels of said sections.

3. Physical training apparatus including spaced towers and a top section interposed between and joining said towers in spaced parallel relation, each tower comprising a series of spaced posts and a series of unitary members disposed transversely of and fixed to the posts and said top section including a series of longitudinally extending tubular rails of rectangular section, U-shaped braces fixed at their legs to the posts and to the rails for securing the rails at their respective ends to the towers and in spaced relation transversely of the apparatus, said rails being provided with registering apertures, a series of unitary tubular bars extending transversely of the apparatus through said registering apertures and fixed to the several rails, and a series of spaced uprights fixed to the rails for supporting the top section intermediate the towers.

4. In physical training apparatus, a tubular structural member comprising a pair of sections, each section being made up of companion channels, and means for conjointly securing the sections together in end-to-end abutting relation and the respective channels of each section together with their flanges in edgewise abutting relation, said means including a splice-member having portions of I-section interposed and fitting between the respective channels of said sections, the I-sections of said member comprising channels having their webs disposed in back-to-back relation, and bolts transversely engaging the webs of the respective channels of said sections and the abutting webs of the interposed splice-portions, the opposed flanges of the splice-member being disposed in flatwise abutting relation to and upon the inner face of the flanges of the channel-members.

5. In physical training apparatus, a pair of tubular structural members each comprising a pair of aligning sections in endwise abutment, the sections of each member having notches in their end margins, and means for securing said members together in spaced parallel relation and the sections of each member together with their notched margins in abutment and with said notches in opposed complementary relation, said means including a splice-member having end-portions of I-section and a bar connecting said portions, the bar extending crosswise between said members and being embraced by the complementary notches of said sections and said end-portions being disposed wholly within said sections, and securing bolts transversely engaging said sections and the webs of said end-portions.

6. Physical training apparatus including spaced towers and a top section interposed between and joining said towers in spaced parallel relation, each tower comprising a series of spaced posts and a series of unitary members disposed transversely of and fixed to the posts and said top section including a series of longitudinally extending tubular rails of rectangular section, U-shaped braces fixed at their legs to the posts and to the rails for securing the rails at their respective ends to the towers and in spaced relation transversely of the apparatus, said rails being provided with registering apertures, a series of unitary tubular bars extending transversely of the apparatus through said registering apertures and fixed to the several rails, a series of spaced uprights fixed to the rails for supporting the top section intermediate the towers, and diagonally and horizontally extending members fixed reinforcingly to the intermediate uprights.

7. Physical training apparatus including spaced towers and a top section interposed between and joining said towers in spaced parallel relation, each tower comprising a series of spaced posts and a series of unitary members disposed transversely of and fixed to the posts and said top section including a series of longitudinally extending tubular rails of rectangular section, U-shaped braces fixed at their legs to the posts and to the rails for securing the rails at their respective ends to the towers and in spaced relation transversely of the apparatus, said rails being provided with registering apertures, a series of unitary tubular bars extending transversely of the apparatus through said registering apertures and fixed to the several rails, a series of spaced uprights fixed to the rails for supporting the top section intermediate the towers, and a ladder disposed obliquely under the top section and intermediate the towers, the ladder comprising side rails each made up of a plurality of sections joined end-to-end and having hand-gripping portions, and cross rung-providing rails extending transversely between and joining the side rails.

8. Physical training apparatus including spaced towers and a top section interposed between and joining said towers in spaced parallel relation, each tower comprising a series of spaced posts and a series of unitary members disposed transversely of and fixed to the posts and said top section including a series of longitudinally extending tubular rails of rectangular section, U-shaped braces fixed at their legs to the posts and to the rails for securing the rails at their respective ends to the towers and in spaced relation transversely of the apparatus, said rails being provided with registering apertures, a series of unitary tubular bars extending transversely of the apparatus through said registering apertures and fixed to the several rails, a series of uprights joined to the top section for supporting the top section intermediate the towers, cross reinforcing members joined to some of the uprights, a ladder disposed obliquely under the top section and intermediate the towers, the ladder comprising side rails each made up of a plurality of sections joined end-to-end and having hand-gripping portions, and cross rung-providing rails extending transversely between and joining the side rails, and hangers depending from some of said reinforcing members and rigidly joined to the ladder side rails.

9. Physical training apparatus including a pair of laterally spaced vertical towers each including a plurality of transversely extending and lengthwise extending horizontal bars adaptable for use in various gymnastic exercises, and a top section extending horizontally between and structurally connecting the upper ends of said towers, said top section including at least three cat-walks extending lengthwise between the towers, one of said cat-walks having a horizontal top surface, another of said cat-walks having a top surface the transverse cross sectional shape of which resembles a V and another of said cat-walks having a top surface the transverse cross sectional shape of which resembles an inverted V.

10. A physical training structure comprising at one end a stall bar tower section and at its opposite end a jungle tower section, a top section extending between and structurally joining the upper ends of said towers, an inclined hand-walk ladder mounted on and extending between said towers beneath the top section, a crawl-tunnel mounted at its end on and extending between said towers beneath the top section, a climb-up rope mounted on the top section and depending therefrom between the towers, a climb-ramp mounted at its ends on and extending between the towers, and a climbing pole mounted at its upper end on the top section and extending downwardly between the towers.

GEORGE T. STAFFORD.
FRANK ALBACH.

Dec. 12, 1944.  F. R. W. STRAFFORD  2,365,118
ELECTRICAL APPARATUS
Filed Aug. 25, 1942
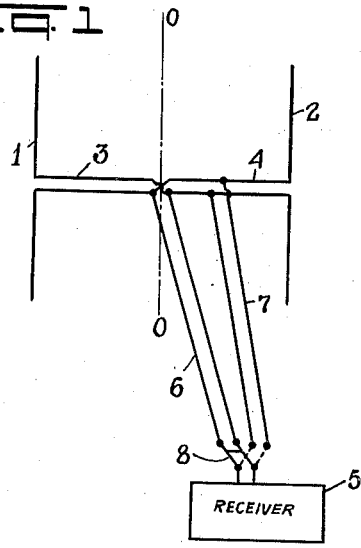
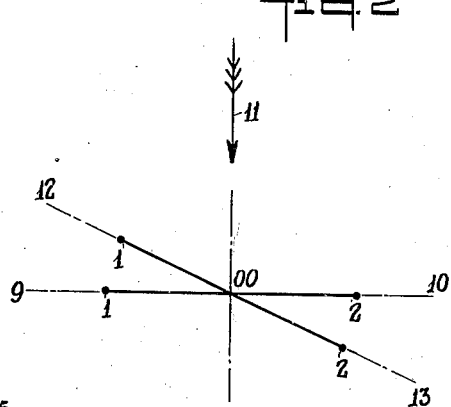
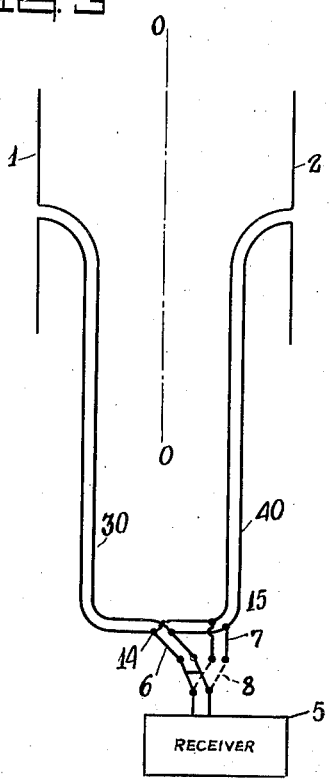
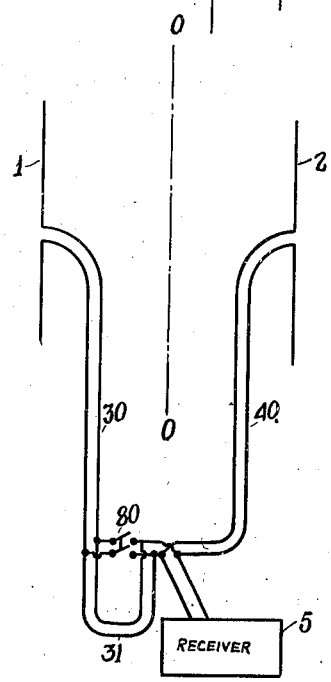
INVENTOR.
Frederick Richmond Wentworth Strafford
BY
ATTORNEY